US009465957B2

(12) United States Patent
Alshinnawi et al.

(10) Patent No.: US 9,465,957 B2
(45) Date of Patent: Oct. 11, 2016

(54) PREVENTING PREDETERMINED TYPE OF CONFIGURATION CHANGES TO COMPUTING DEVICES IN A COMPUTING SYSTEM SERVICING A CRITICAL JOB

(71) Applicant: LENOVO ENTERPRISE SOLUTIONS (SINGAPORE) PTE. LTD., Singapore (SG)

(72) Inventors: Shareef F. Alshinnawi, Durham, NC (US); Gary D. Cudak, Creedmoor, NC (US); Edward S. Suffern, Chapel Hill, NC (US); J. Mark Weber, Wake Forest, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 328 days.

(21) Appl. No.: 14/074,415

(22) Filed: Nov. 7, 2013

(65) Prior Publication Data
US 2015/0128286 A1    May 7, 2015

(51) Int. Cl.
*G06F 21/60* (2013.01)
*G06F 21/64* (2013.01)
*G06F 21/70* (2013.01)
*G06F 21/52* (2013.01)
*G06F 21/62* (2013.01)

(52) U.S. Cl.
CPC ............... *G06F 21/64* (2013.01); *G06F 21/52* (2013.01); *G06F 21/70* (2013.01); *G06F 21/60* (2013.01); *G06F 21/6209* (2013.01); *G06F 2221/2141* (2013.01)

(58) Field of Classification Search
None
See application file for complete search history.

(56) References Cited

U.S. PATENT DOCUMENTS

| 7,023,979 | B1 * | 4/2006 | Wu | H04M 3/5233 379/265.11 |
| 7,287,077 | B2 | 10/2007 | Haugh et al. | |
| 7,290,284 | B1 * | 10/2007 | Wettergren | G06F 21/6218 711/163 |
| 7,640,317 | B2 | 12/2009 | Jain et al. | |
| 8,429,282 | B1 * | 4/2013 | Ahuja | H04L 47/19 709/219 |
| 9,077,485 | B2 * | 7/2015 | Brown | G06F 21/305 |
| 2006/0031427 | A1 * | 2/2006 | Jain | H04L 41/028 709/220 |
| 2008/0034415 | A1 * | 2/2008 | Chacko | G06F 21/552 726/14 |
| 2008/0059554 | A1 * | 3/2008 | Dawson | H04L 67/10 709/201 |
| 2009/0190749 | A1 * | 7/2009 | Xie | H04M 3/5232 379/266.01 |
| 2011/0126197 | A1 | 5/2011 | Larsen et al. | |
| 2013/0107228 | A1 * | 5/2013 | Tsuji | G03B 21/145 353/70 |

OTHER PUBLICATIONS

Garretson, "Stupid Data Centre Tricks—Mistakes and Mishaps Threaten Your Servers", techworld.com (online publication), Aug. 2010, [accessed May 9, 2013], 3 pp., URL: http://features.techworld.com/data-centre/3236645/stupid-data-centre-tricks/.

* cited by examiner

*Primary Examiner* — Abu Ghaffari
(74) *Attorney, Agent, or Firm* — Brandcon C. Kennedy; Katherine S. Brown; Kennedy Lenart Spraggins LLP

(57) ABSTRACT

Preventing changes to computing devices in a computing system servicing a critical job, including: identifying, by a job protection module, a critical job executing in the computing system; identifying, by the job protection module, one or more computing devices in the computing system utilized during execution of the critical job; and locking, by the job protection module, each of the one or more computing devices in the computing system utilized during execution of the critical job from undergoing a configuration change during execution of the critical job.

12 Claims, 5 Drawing Sheets

PREVENTING PREDETERMINED TYPE OF CONFIGURATION CHANGES TO COMPUTING DEVICES IN A COMPUTING SYSTEM SERVICING A CRITICAL JOB

BACKGROUND OF THE INVENTION

1. Field of the Invention

The field of the invention is data processing, or, more specifically, methods, apparatus, and products for preventing changes to computing devices in a computing system servicing a critical job.

2. Description of Related Art

Modern computing systems can include many computing devices arranged in a variety of ways. Such computing systems, and the computing devices contained therein, may be managed by a system administrator or other privileged user. A system administrator or other privileged user may inadvertently or mistakenly change configurations on computing devices within the computing system while critical jobs are executing. Changing the configuration of computing devices within the computing system may negatively impact the performance of such critical jobs.

SUMMARY OF THE INVENTION

Methods, apparatuses, and products for preventing changes to computing devices in a computing system servicing a critical job, including: identifying, by a job protection module, a critical job executing in the computing system; identifying, by the job protection module, one or more computing devices in the computing system utilized during execution of the critical job; and locking, by the job protection module, each of the one or more computing devices in the computing system utilized during execution of the critical job from undergoing a configuration change during execution of the critical job.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
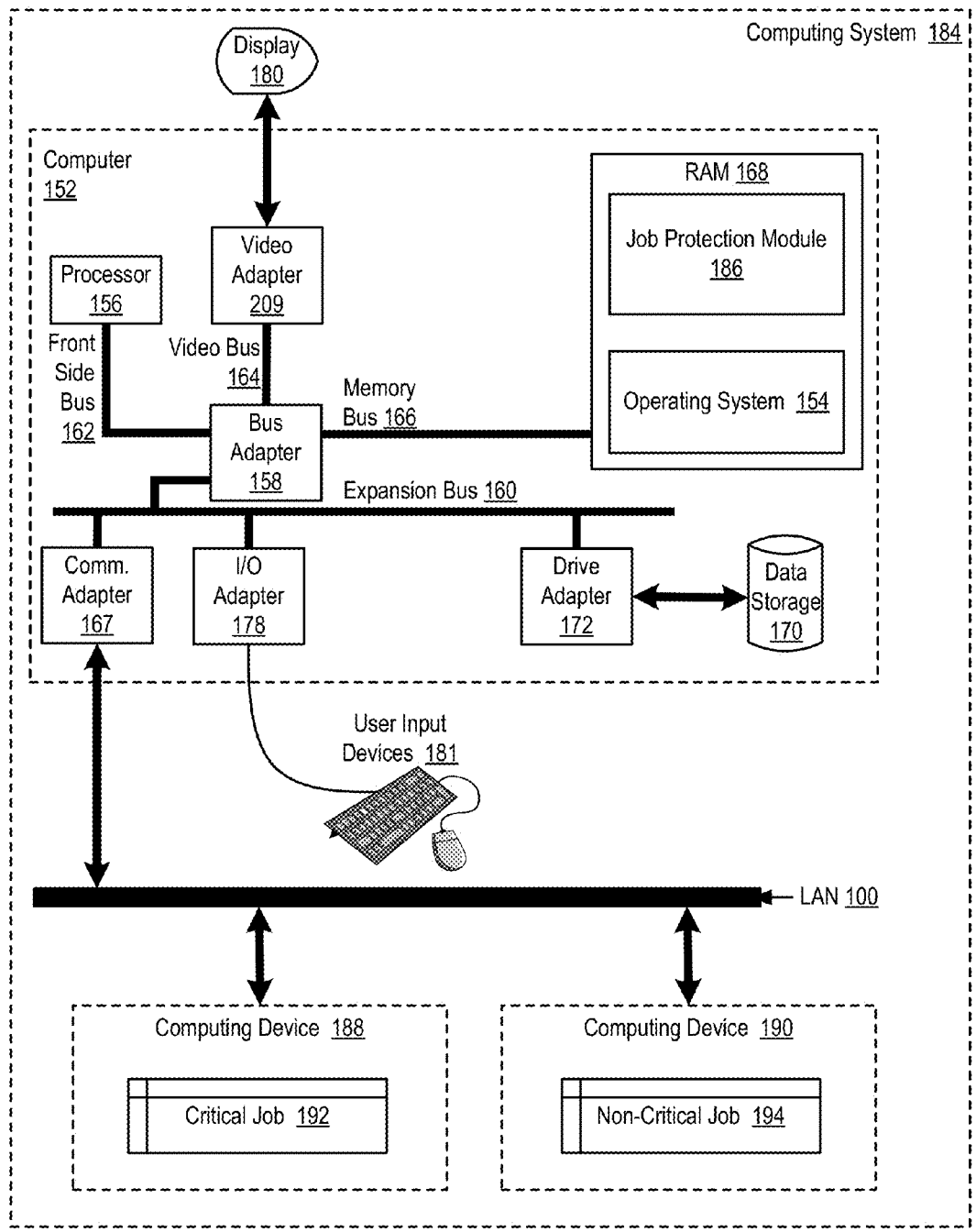
FIG. 1 sets forth a block diagram of automated computing machinery comprising an example computer useful in preventing changes to computing devices in a computing system servicing a critical job according to embodiments of the present invention.

Example methods, apparatuses, and products for preventing changes to computing devices in a computing system servicing a critical job in accordance with the present invention are described with reference to the accompanying drawings, beginning with FIG. 1. FIG. 1 sets forth a block diagram of automated computing machinery comprising an example computer (152) useful in preventing changes to computing devices (188) in a computing system (184) servicing a critical job (192) according to embodiments of the present invention. The computing system (184) of FIG. 1 may be embodied, for example, as a cloud computing environment where the computing devices (188, 190) are embodied as servers, storage devices, and other devices. The computing system (184) of FIG. 1 may also be embodied as a data center where the computing devices (188, 190) are embodied as servers, as a server where the computing devices (188, 190) are embodied as server components such as a computer processor, network adapter, virtual machine, and so on. Readers will appreciate that the computing system (184) of FIG. 1 may be embodied as any computing system that includes component parts that may be configured by a system administrator, privileged user, or other administrative entity.

The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152). Stored in RAM (168) is a job protection module (186), a module of computer program instructions for preventing changes to computing devices (188) in a computing system (184) servicing a critical job (192) according to embodiments of the present invention.

The job protection module (186) of FIG. 1 may be configured to prevent changes to computing devices (188) in a computing system (184) servicing a critical job (192) by identifying a critical job (192) executing in the computing system (184). The example of FIG. 1 depicts a critical job (192) executing on a computing device (188) and a non-critical job (194) executing on another computing device (190). In such an example, the critical job (192) represents a job whose execution has been deemed to be of greater importance than the execution of the non-critical job (194). For example, the critical job (192) may be executed to carry out some portion of the core functionality of the computing system (184) while the non-critical job (194) may carries out non-essential functions such as scheduled backup of data that can be delayed if necessary.

In the example of FIG. 1, each job (192, 194) may be associated with a criticality level or other indicator of criticality. In such an example, the critical job (192) executing in the computing system (184) may be associated with a criticality level that meets a predetermined threshold while the non-critical job (194) may be associated with a criticality level that does not meet the predetermined threshold. Identifying a critical job (192) executing in the computing system (184) may therefore be carried out, for example, by examining metadata associated with each job (192, 194) executing in the computing system (184) and identifying jobs whose criticality levels meet a predetermined threshold. Metadata associated with each job (192, 194) executing in the computing system (184) may be embodied, for example, as a table or other data structure created by a system administer that associates identifiers for each job (192, 194) with a criticality level of the job (192, 194), as metadata contained in an instruction to execute the job, and so on.

The job protection module (186) of FIG. 1 may be further configured to prevent changes to computing devices (188) in a computing system (184) that are servicing a critical job (192) by identifying one or more computing devices (188) in the computing system (184) that is utilized during execution of the critical job (192). Identifying one or more computing devices (188) in the computing system (184) that is utilized during execution of the critical job (192) may be carried out by the job protection module (186) communicating with other system management tools, such as resource provisioning tools, job schedulers, and so on.

Consider an example in which the computing system (184) is embodied as a cluster that includes compute nodes, service/master nodes, login nodes, storage nodes, and so on. In such an example, a job scheduler may reside on a service/master node. The service/master node may also include a distributed computing management and provisioning tool such as Extreme Cloud Administration Toolkit ('xCAT'). In such an example, xCAT can discover the layout of the cluster configuration at installation time. Because xCAT and the job scheduler may reside on the same service/master node, xCAT and the job scheduler may be in communication to provision resources for a scheduled job and to deploy the scheduled job on the provisioned resources. In such a way, xCAT may determine which compute nodes are supporting the execution of each job (192, 194) executing in the computing system (184). The job protection module (186) may therefore identify one or more computing devices (188) in the computing system (184) utilized during execution of the critical job (192) by requesting such information from xCAT for each job (192) that the job protection module (186) has identified as being critical.

Although the example described above includes the job protection module (186) communicating with a distributed computing management and provisioning tool, readers will appreciate that in some embodiments the job protection module (186) may actually be a sub-component of the distributed computing management and provisioning tool. The separation of the job protection module (186) and the distributed computing management and provisioning tool is not a requirement of embodiments of the present invention, nor is it required that the job protection module (186) and the distributed computing management and provisioning tool be part of the same software tool.

The job protection module (186) of FIG. 1 may be further configured to prevent changes to computing devices (188) in a computing system (184) that are servicing a critical job (192) by locking each of the one or more computing devices (188) in the computing system (184) utilized during execution of the critical job (192). In the example of FIG. 1, each of the one or more computing devices (188) in the computing system (184) utilized during execution of the critical job (192) may be locked from undergoing a configuration change during execution of the critical job (192). Locking each of the one or more computing devices (188) from undergoing a configuration change during execution of the critical job (192) may result in the computing devices (188) retaining the same configuration settings throughout the period during which the critical job (192) is being executed. In such a way, a configuration change in the computing devices (188) cannot prevent the critical job (192) executing on the computing devices (188) from completing.

The job protection module (186) may be configured to lock each of the one or more computing devices (188) in the computing system (184), for example, by setting a flag in the critical job (192) that is examined by other system management tools, such as resource provisioning tools, job schedulers, and so on. For example, the job protection module (186) may set a flag associated with the critical job (192) that is received by xCAT as part of the process of scheduling the critical job (192). In response to examining the flag, xCAT may subsequently determine which computing devices (188) in the computing system (184) are required to execute the critical job (192). In such an example, xCAT may send a command to each of the computing devices (188) to lock the configuration settings of the computing devices (188). Once the configuration settings for each of the computing devices (188) are locked, a system administrator may still access each of the computing devices (188) to retrieve diagnostic information or other information from the computing devices (188), but the system administrator will be unable to change the configuration settings for the computing devices (188).

Also stored in RAM (168) is an operating system (154). Operating systems useful preventing changes to computing devices in a computing system servicing a critical job according to embodiments of the present invention include UNIX™, Linux™, Microsoft XP™, AIX™, IBM's i5/OS™, and others as will occur to those of skill in the art. The operating system (154) and the job protection module (202) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for preventing changes to computing devices in a computing system servicing a critical job according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The example computer (152) of FIG. 1 includes a communications adapter (167) for data communications with other computers and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for preventing changes to computing devices in a computing system servicing a critical job according to embodiments of the present invention include modems for wired dial-up communications, Ethernet (IEEE 802.3) adapters for wired data communications network communications, and 802.11 adapters for wireless data communications network communications.

Figure 2:
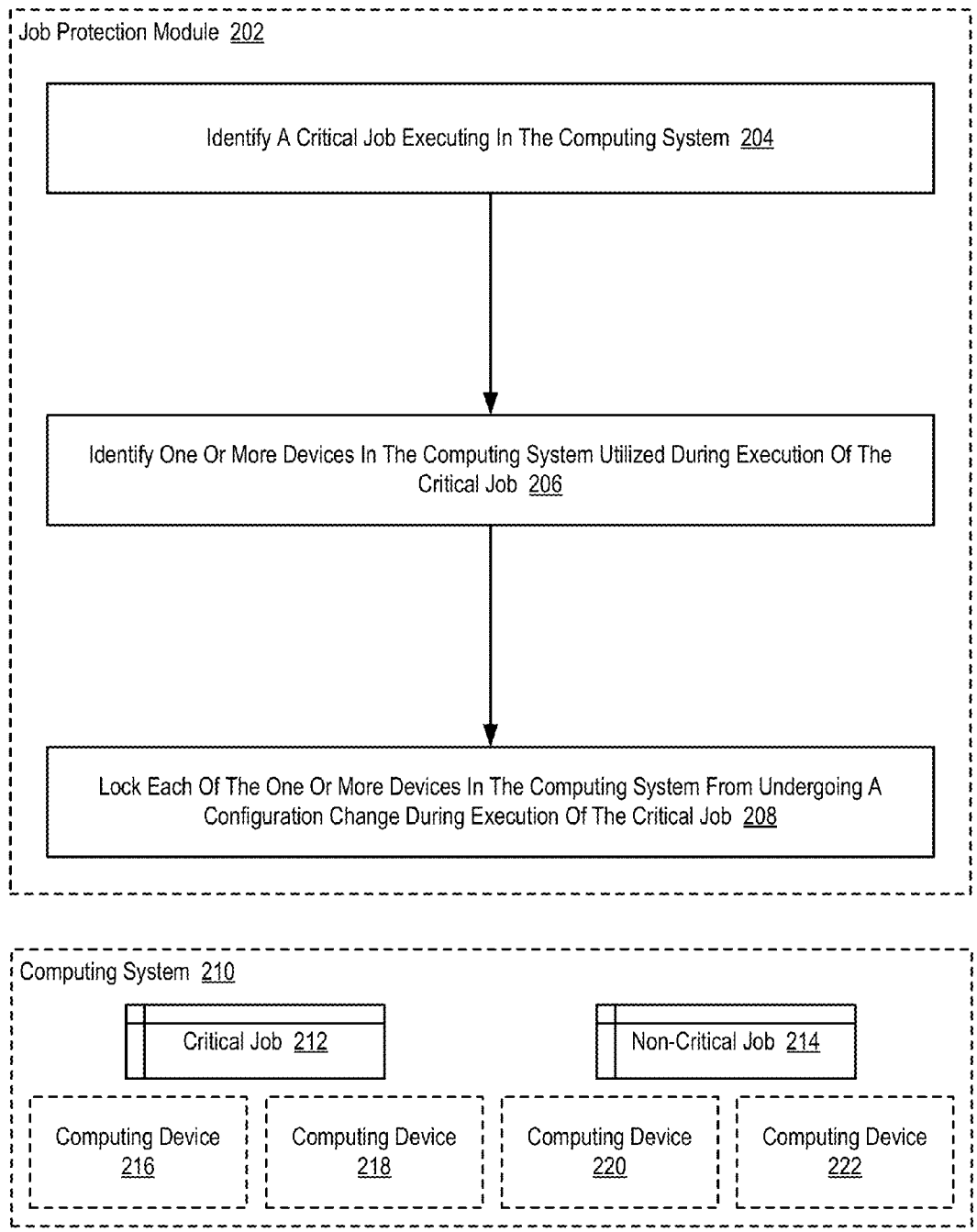
FIG. 2 sets forth a flow chart illustrating an example method for preventing changes to computing devices in a computing system servicing a critical job according to embodiments of the present invention.

For further explanation, FIG. 2 sets forth a flow chart illustrating an example method for preventing changes to computing devices (216, 218, 220, 222) in a computing system (210) servicing a critical job according to embodiments of the present invention. The computing system (210) of FIG. 2 may be embodied, for example, as a cloud computing environment that includes a plurality of various devices of various device types, as a data center where the computing devices (216, 218, 220, 222) are embodied as servers, and so on. Readers will appreciate that the computing system (210) of FIG. 2 may be embodied as any computing system that includes component parts that may be configured by a system administrator, privileged user, or other administrative entity.

The example method of FIG. 2 is carried out, at least in part, by a job protection module (202). The job protection module (202) of FIG. 2 may be embodied, for example, as a module of computer program instructions executing on computer hardware such as a computer processor, as a module of computer program instructions executing on virtualized computer hardware such as a virtual machine, and so on. In the example method of FIG. 2, the job protection module (202) is depicted as being external to the computing system (210). Readers will appreciate, however, that in other embodiments the job protection module (202) may reside on one or more of the computing devices (216, 218, 220, 222) in the computing system (210).

The example method of FIG. 2 includes identifying (204), by the job protection module (202), a critical job (212) executing in the computing system (210). The example method of FIG. 2 depicts a critical job (212) and a non-critical job (214). In such an example, the critical job (212) represents a job whose execution has been deemed to be of greater importance than the execution of the non-critical job (214). For example, the critical job (212) may be executed to carry out some portion of the core functionality of the computing system (210) while the non-critical job (214) carries out non-essential functions such as a scheduled backup of data that can be delayed if necessary.

Each job (212, 214) executing in the computing system (210) may be associated with a criticality level or other indicator of criticality. In such an example, the critical job (212) executing in the computing system (210) may be associated with a criticality level that meets a predetermined threshold while the non-critical job (214) may be associated with a criticality level that does not meet the predetermined threshold. Identifying (204) a critical job (212) executing in the computing system (210) may therefore be carried out, for example, by examining metadata associated with each job (212, 214) executing in the computing system (210) and identifying jobs whose criticality levels meet a predetermined threshold. Metadata associated with each job (212, 214) executing in the computing system (210) may be embodied, for example, as a table or other data structure created by a system administer that associates identifiers for each job (212, 214) with a criticality level of the job (212, 214).

The example method of FIG. 2 also includes identifying (206), by the job protection module (202), one or more computing devices (216, 218, 220) in the computing system (210) utilized during execution of the critical job (212). In the example method of FIG. 2, identifying (206) one or more computing devices (216, 218, 220) in the computing system (210) utilized during execution of the critical job (212) may be carried out by the job protection module (202) communicating with other system management tools, such as resource provisioning tools, job schedulers, and so on. The example method depicted in FIG. 2 is described herein as including three computing devices (216, 218, 220) utilized during execution of the critical job (212). In such an example, the computing system (210) also includes one computing device (222) that is not utilized during execution of the critical job (212). The one computing device (222) that is not utilized during execution of the critical job (212) may be utilized for other purposes such as, for example, executing a non-critical job (214).

Consider an example in which the computing system (210) is embodied as a cluster that includes compute nodes, service/master nodes, login nodes, storage nodes, and so on. In such an example, a job scheduler may reside on a service/master node. The service/master node may also include a distributed computing management and provisioning tool such as xCAT. In such an example, xCAT can discover the layout of the cluster configuration at installation time. Because xCAT and the job scheduler may reside on the same service/master node, xCAT and the job scheduler may be in communication to provision resources for a scheduled job and to deploy the scheduled job on the provisioned resources. In such a way, xCAT may determine which compute nodes are supporting the execution of each job (212, 214) executing in the computing system (210). The job protection module (202) may therefore identify (206) one or more computing devices (216, 218, 220) in the computing system (210) utilized during execution of the critical job (212) by requesting such information from xCAT for each job (212) that the job protection module (202) has identified (204) as critical.

Although the example described above includes the job protection module (202) communicating with a distributed computing management and provisioning tool, readers will appreciate that in some embodiments the job protection module (202) may actually be a sub-component of the distributed computing management and provisioning tool. The separation of the job protection module (202) and the distributed computing management and provisioning tool is not a requirement of embodiments of the present invention, nor is it required that the job protection module (202) and the distributed computing management and provisioning tool be part of the same software tool.

The example method of FIG. 2 also includes locking (208), by the job protection module (202), each of the one or more computing devices (216, 218, 220) in the computing system (210) utilized during execution of the critical job (212). In the example method of FIG. 2, each of the one or more computing devices (216, 218, 220) in the computing system (210) utilized during execution of the critical job (212) are locked (208) from undergoing a configuration change during execution of the critical job (212). In the example method of FIG. 2, locking (208) each of the one or more computing devices (216, 218, 220) from undergoing a configuration change during execution of the critical job (212) may result in the computing devices (216, 218, 220) retaining the same configuration settings throughout the period during which the critical job (212) is being executed. In such a way, a configuration change in the computing devices (216, 218, 220) cannot prevent the critical job (212) executing on the computing devices (216, 218, 220) from completing.

Consider an example in which executing the critical job (212) includes transferring data between two of the computing devices (216, 218) via a third computing device (220) such as a network switch. In such an example, changing configuration settings of the network switch may result in a disruption of data communications between the two computing devices (216, 218). For example, if the network switch is embodied as a Virtual Protocol Interconnect ('VPI') switch capable of operating in an InfiniBand mode, an Ethernet mode, or a Fibre Channel mode, changing the configuration settings of the switch to operate in a different mode may prevent the computing devices (216, 218) from exchanging data as the computing devices (216, 218) may not be configured to communicate over each type of data communications channel.

In the example method of FIG. 2, the job protection module (202) may be configured to lock (208) each of the one or more computing devices (216, 218, 220), for example, by setting a flag in the critical job (212) that is examined by other system management tools, such as resource provisioning tools, job schedulers, and so on. For example, the job protection module (202) may set a flag associated with the critical job (212) that is viewed by xCAT as part of the process of scheduling the critical job (212). In response to viewing the flag, xCAT may subsequently determine which computing devices (216, 218, 220) in the computing system (210) are required to execute the critical job (212). In such an example, xCAT may send a command to each of the computing devices (216, 218, 220) to lock the configuration settings of the computing devices (216, 218, 220). Once the configuration settings for each of the computing devices (216, 218, 220) are locked, a system administrator may still access each of the computing devices (216, 218, 220) to retrieve diagnostic information or other information from the computing devices (216, 218, 220), but the system administrator will be unable to change the configuration settings for the computing devices (216, 218, 220).

Figure 3:
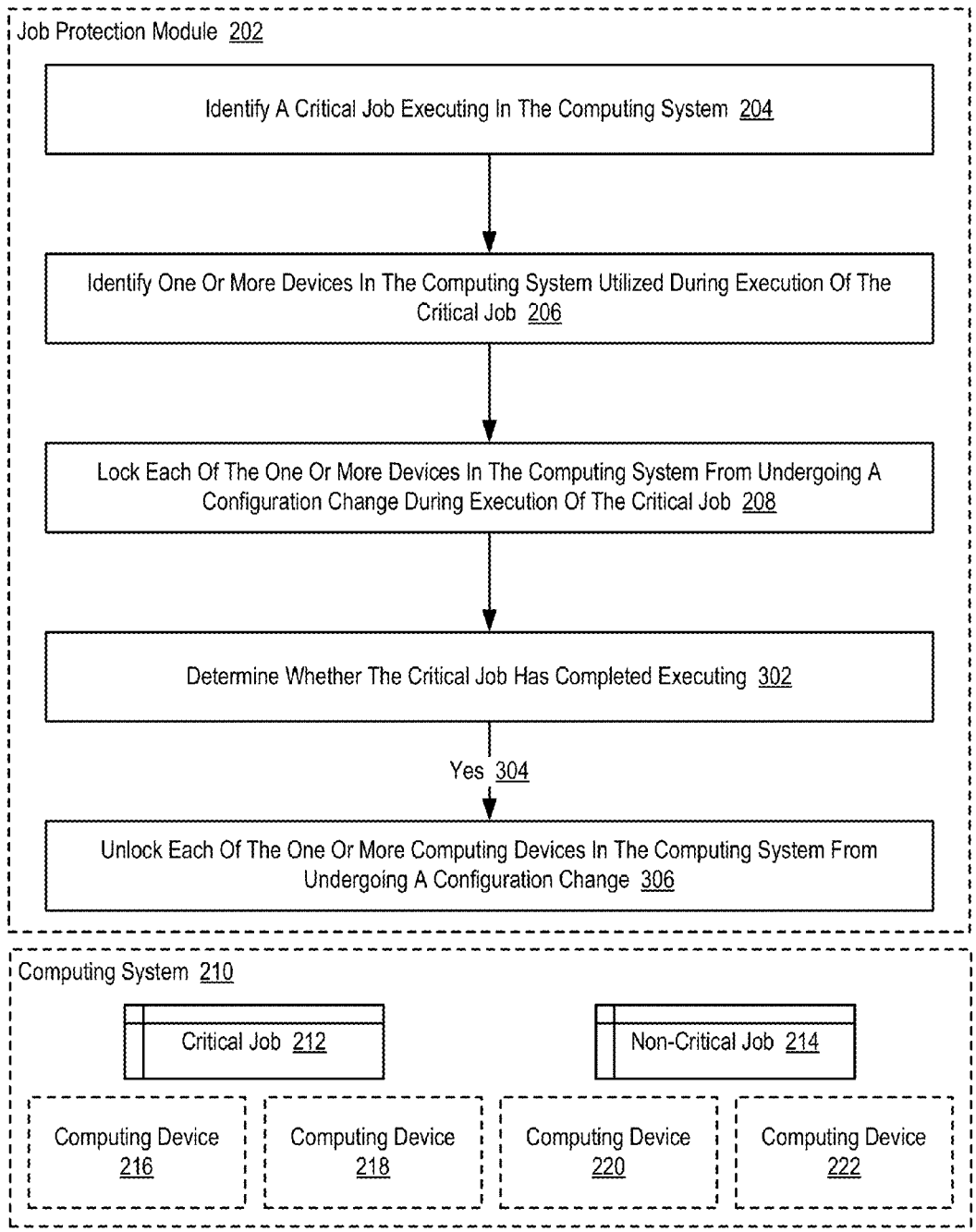
FIG. 3 sets forth a flow chart illustrating an additional example method for preventing changes to computing devices in a computing system servicing a critical job according to embodiments of the present invention.

For further explanation, FIG. 3 sets forth a flow chart illustrating an additional example method for preventing changes to computing devices in a computing system servicing a critical job according to embodiments of the present invention. The example method of FIG. 3 is similar to the example method of FIG. 2, as it also includes identifying (204) a critical job (212) executing in the computing system (210), identifying (206) one or more computing devices (216, 218, 220) in the computing system (210) utilized during execution of the critical job (212), and locking (208) each of the one or more computing devices (216, 218, 220) in the computing system (210) utilized during execution of the critical job (212) from undergoing a configuration change during execution of the critical job (212).

The example method of FIG. 3 also includes determining (302), by the job protection module (202), whether the critical job (212) has completed executing. In the example method of FIG. 3, determining (302) whether the critical job (212) has completed executing may be carried out by the job protection module (202) communicating with other system management tools, such as resource provisioning tools, job schedulers, and so on. For example, the job protection module (202) may request a list of currently executing jobs from the job scheduler and may subsequently determine whether the critical job (212) is one of the currently executing jobs. Alternatively, a system management tool may send a message to the job protection module (202) indicating that the critical job (212) has completed executing upon completion of the critical job (212).

The example method of FIG. 3 also includes unlocking (306), by the job protection module (202), each of the one or more computing devices (216, 218, 220) in the computing system (210) utilized during execution of the critical job (212) from undergoing a configuration change. In the example method of FIG. 3, unlocking (306) each of the one or more computing devices (216, 218, 220) in the computing system (210) may be carried out in response to affirmatively (304) determining that the critical job (212) has completed executing. Unlocking (306) each of the one or more computing devices (216, 218, 220) in the computing system (210) may result in the computing devices (216, 218, 220) being available for reconfiguration, as the configuration settings of the one or more computing devices (216, 218, 220) are no longer locked. Unlocking (306) each of the one or more computing devices (216, 218, 220) in the computing system (210) utilized during execution of the critical job (212) may be carried out, for example, by the job protection module (202) communicating with other system management tools, such as resource provisioning tools, job schedulers, and so on. For example, the job protection module (202) may send a message to xCAT identifying a critical job (212) that has finished executing, such that xCAT can subsequently send a command to each of the computing devices (216, 218, 220) to unlock the configuration settings of the computing devices (216, 218, 220) so long as no other critical jobs are executing on the computing devices (216, 218, 220).

Figure 4:
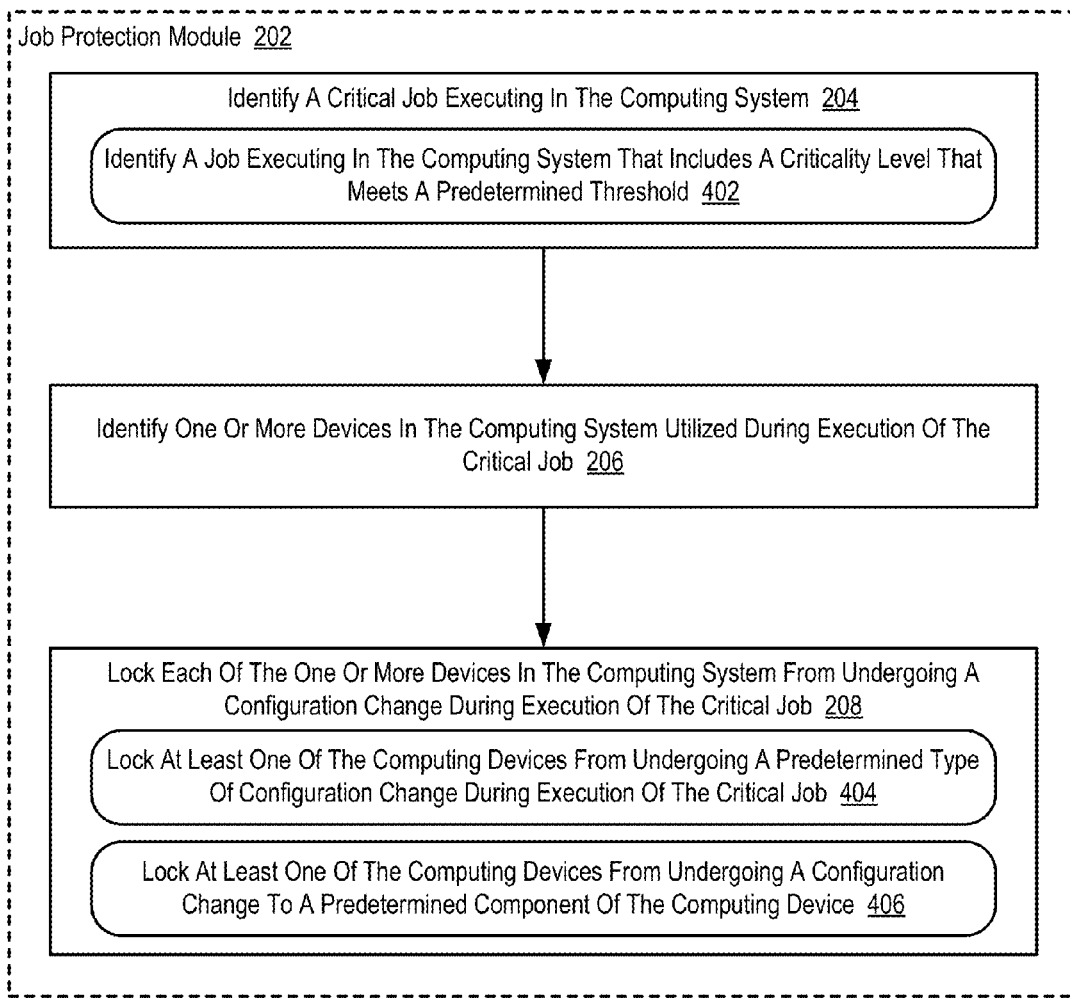
FIG. 4 sets forth a flow chart illustrating an additional example method for preventing changes to computing devices in a computing system servicing a critical job according to embodiments of the present invention.
Figure 4:
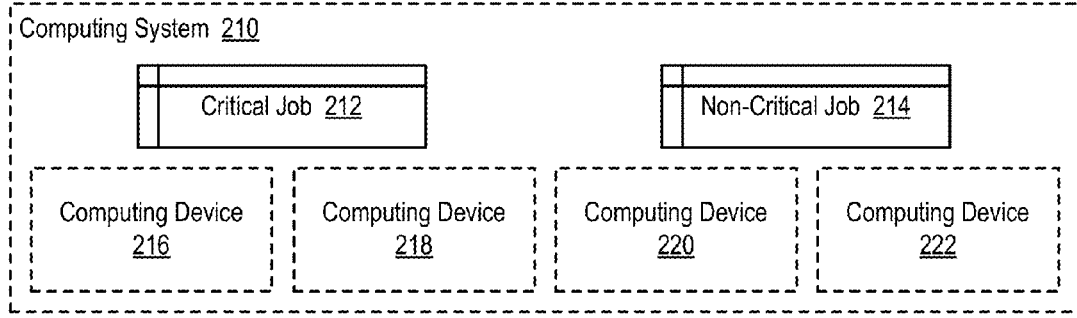

For further explanation, FIG. 4 sets forth a flow chart illustrating an additional example method for preventing changes to computing devices in a computing system servicing a critical job according to embodiments of the present invention. The example method of FIG. 4 is similar to the example method of FIG. 2, as it also includes identifying (204) a critical job (212) executing in the computing system (210), identifying (206) one or more computing devices (216, 218, 220) in the computing system (210) utilized during execution of the critical job (212), and locking (208) each of the one or more computing devices (216, 218, 220) in the computing system (210) utilized during execution of the critical job (212) from undergoing a configuration change during execution of the critical job (212).

In the example method of FIG. 4, identifying (204) a critical job (212) executing in the computing system (210) can include identifying (402) a job executing in the computing system (210) that includes a criticality level that meets a predetermined threshold. In the example method of FIG. 4, the criticality level may represent an indication of how important a particular job is to overall system operation. Each job (212, 214) executing in the computing system (210) may be assigned a criticality level such as "low," "medium," or "high." In such an example, the criticality level associated with each job (212, 214) executing in the computing system (210) may be compared to the predetermined threshold. Identifying (402) a job executing in the computing system (210) that includes a criticality level that meets a predetermined threshold may therefore be carried out, for example, by examining metadata associated with each job (212, 214) executing in the computing system (210) and identifying jobs whose criticality levels meet a predetermined threshold. Metadata associated with each job (212, 214) executing in the computing system (210) may be embodied, for example, as a table or other data structure created by a system administer that associates identifiers for each job (212, 214) with a criticality level of the job (212, 214).

In the example method of FIG. 4, locking (208) each of the one or more computing devices (216, 218, 220) in the computing system (210) utilized during execution of the critical job (212) can include locking (404) at least one of the computing devices (216, 218, 220) from undergoing a predetermined type of configuration change during execution of the critical job (212). A predetermined type of configuration change may include, for example, changes to the operating system of a computing device, changes that require the computing device to be rebooted in order to implement the changes, changes that alter data communications capabilities of the computing device, and so on. In such an example, each predetermined type of configuration change may represent a particular category of change— some of which may be allowed during execution of the critical job (212) and some of which may be prohibited during execution of the critical job (212). In such a way, a particular computing device (216) may be locked (404) from undergoing a predetermined type of configuration change during execution of the critical job (212) while still being free to undergo other types of configuration changes during execution of the critical job (212).

In the example method of FIG. 4, locking (208) each of the one or more computing devices (216, 218, 220) in the computing system (210) utilized during execution of the critical job (212) can alternatively include locking (406) at least one of the computing devices (216, 218, 220) from undergoing a configuration change to a predetermined component of the computing device (216, 218, 220). In the example method of FIG. 4, the predetermined component of the computing device (216, 218, 220) may represent a hardware component of the computing device (216, 218, 220), a software component of the computing device (216, 218, 220), or any combination thereof.

Consider an example in which a computing device (216) is embodied as a multi-port switch and that the critical job (212) is using a subset of the ports for data communications. In such an example, the ports utilized by the critical job (212) may be locked (406) from undergoing a configuration change while the ports that are not utilized by the critical job (212) may be reconfigured freely as reconfiguring ports that are not utilized by the critical job (212) will not impact the execution of the critical job (212). In such a way, locking (406) at least one of the computing devices (216, 218, 220) from undergoing a configuration change to a predetermined component of the computing device (216, 218, 220) may be carried out, for example, by identifying the predetermined components of the computing device (216, 218, 220) that should be locked from undergoing a configuration change, by identifying components of the computing device (216, 218, 220) that should not be blocked from undergoing a configuration change, and so on.

Figure 5:
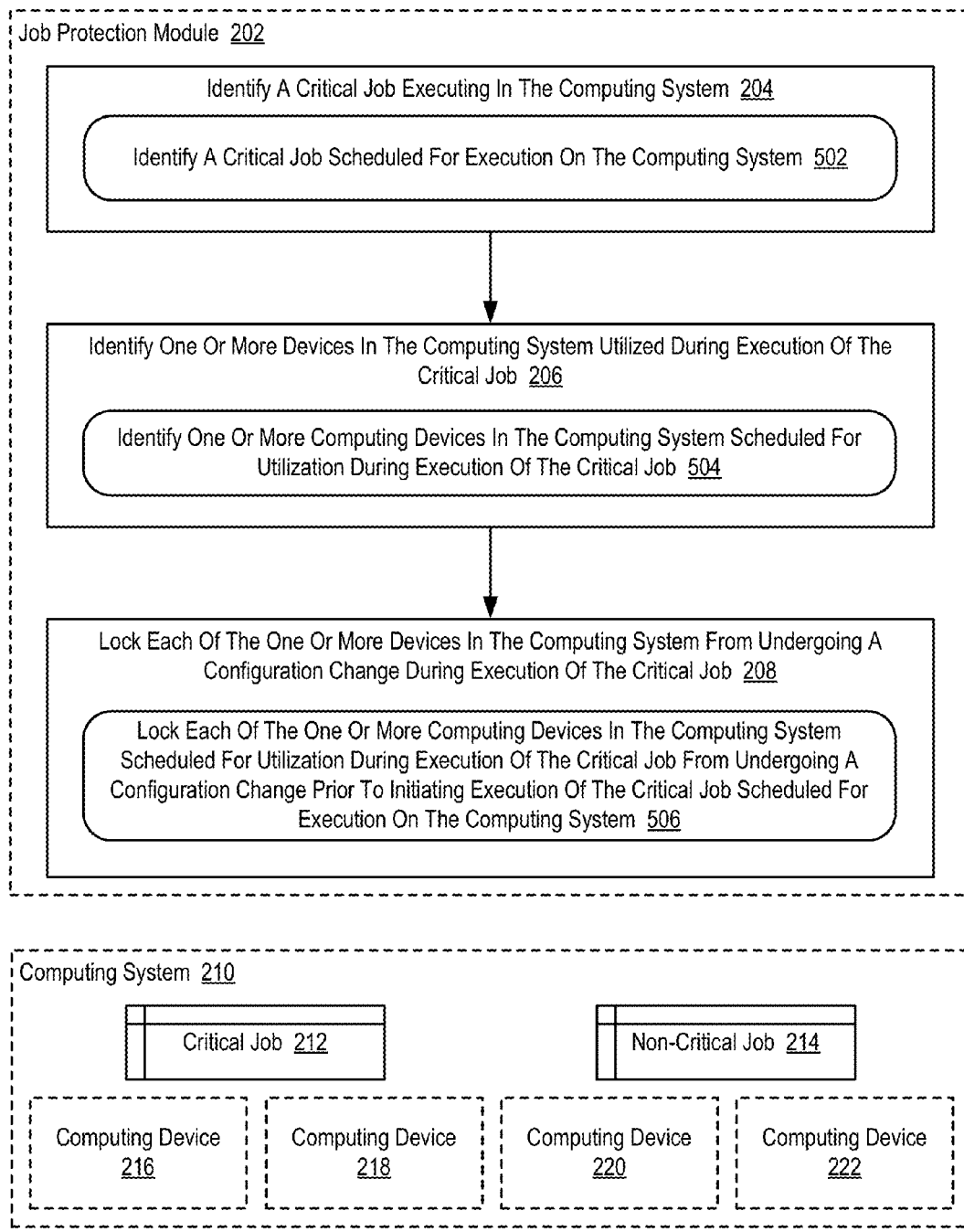
FIG. 5 sets forth a flow chart illustrating an additional example method for preventing changes to computing devices in a computing system servicing a critical job according to embodiments of the present invention.

For further explanation, FIG. 5 sets forth a flow chart illustrating an additional example method for preventing changes to computing devices in a computing system servicing a critical job according to embodiments of the present invention. The example method of FIG. 5 is similar to the example method of FIG. 2, as it also includes identifying (204) a critical job (212) executing in the computing system (210), identifying (206) one or more computing devices (216, 218, 220) in the computing system (210) utilized during execution of the critical job (212), and locking (208) each of the one or more computing devices (216, 218, 220) in the computing system (210) utilized during execution of the critical job (212) from undergoing a configuration change during execution of the critical job (212).

In the example method of FIG. 5, identifying (204) a critical job (212) executing in the computing system (210) can include identifying (502) a critical job (212) scheduled for execution on the computing system (210). In the example method of FIG. 5, identifying (502) a critical job (212) scheduled for execution on the computing system (210) may be carried out, for example, by requesting an identification of all jobs scheduled to be executed from a job scheduler or other system administration module. The critical job (212) scheduled for execution on the computing system (210) can represent a job that will be executed at some point in the future but is not currently executing.

In the example method of FIG. 5, identifying (206) one or more computing devices (216, 218, 220) in the computing system (210) utilized during execution of the critical job (212) can include identifying (504) one or more computing devices (216, 218, 220, 222) in the computing system (210) scheduled for utilization during execution of the critical job (212). In the example method of FIG. 5, identifying (504) one or more computing devices (216, 218, 220, 222) in the computing system (210) scheduled for utilization during execution of the critical job (212) may be carried out, for example, by requesting an identification of all computing (216, 218, 220, 222) in the computing system (210) that will be allocated for use by a resource provisioning component or other system administration module. Alternatively, the job protection module (202) may maintain, or otherwise have access to, a data repository that includes an identifier of each computing device utilized by the critical job (212) during previous execution instances of the critical job (212). In such a way, the job protection module (202) may identify resources that will be utilized during execution of the critical job (212) prior to the critical job (212) actually executing.

In the example method of FIG. 5, locking (208) each of the one or more computing devices (216, 218, 220) in the computing system (210) utilized during execution of the critical job (212) can include locking (506) each of the one or more computing devices (216, 218, 220, 222) in the computing system (210) scheduled for utilization during execution of the critical job (212) from undergoing a configuration change prior to initiating execution of the critical job (212) scheduled for execution on the computing system (210). In the example method of FIG. 5, locking (506) each of the one or more computing devices (216, 218, 220, 222) in the computing system (210) scheduled for utilization during execution of the critical job (212) prior to initiating execution of the critical job (212) scheduled for execution on the computing system (210) may be carried out, for example, by the job protection module (202) sending a command to the one or more computing devices (216, 218, 220, 222) in the computing system (210) scheduled for utilization during execution of the critical job (212) instructing each of the computing devices (216, 218, 220, 222) to retain all current configuration information until further notice. Such a command may be sent from the job protection module (202), directly or indirectly through other system administration tools, to each of computing devices (216, 218, 220, 222) in the computing system (210) scheduled for utilization during execution of the critical job (212).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
    by computer program instructions on a computing device, identifying a critical job executing in a computing system, wherein identifying the critical job includes identifying a job executing in the computing system that includes a criticality level that meets a predetermined threshold based on metadata associated with the job;

identifying one or more computing devices in the computing system utilized during execution of the critical job; and locking each of the one or more computing devices in the computing system utilized during execution of the critical job from undergoing a configuration change during execution of the critical job, wherein locking includes locking each of the one or more computing devices from undergoing a predetermined type of configuration change during execution of the critical job.

2. The method of claim 1 further comprising:

determining whether the critical job has completed executing; and responsive to determining that the critical job has completed executing, unlocking each of the one or more computing devices in the computing system utilized during execution of the critical job from undergoing the configuration change.

3. The method of claim 1 wherein locking each of the one or more computing devices in the computing system utilized during execution of the critical job from undergoing the configuration change during execution of the critical job further comprises locking at least one of the computing devices from undergoing the configuration change to a predetermined component of the computing device.

4. The method of claim 1 wherein:

identifying the critical job executing in the computing system further comprises identifying the critical job scheduled for execution on the computing system;

identifying one or more computing devices in the computing system utilized during execution of the critical job further comprises identifying one or more computing devices in the computing system scheduled for utilization during execution of the critical job; and locking each of the one or more computing devices in the computing system utilized during execution of the critical job from undergoing the configuration change during execution of the critical job further comprises locking each of the one or more computing devices in the computing system scheduled for utilization during execution of the critical job from undergoing the configuration change prior to initiating execution of the critical job scheduled for execution on the computing system.

5. An apparatus comprising a computer processor and a computer memory operatively coupled to the computer processor, the computer memory having disposed within it computer program instructions that, when executed by the computer processor, cause the apparatus to carry out the steps of:

identifying a critical job executing in a computing system, wherein identifying the critical job includes identifying a job executing in the computing system that includes a criticality level that meets a predetermined threshold based on metadata associated with the job;

identifying one or more computing devices in the computing system utilized during execution of the critical job; and locking each of the one or more computing devices in the computing system utilized during execution of the critical job from undergoing a configuration change during execution of the critical job, wherein locking includes locking each of the one or more computing devices from undergoing a predetermined type of configuration change during execution of the critical job.

6. The apparatus of claim 5 further comprising computer program instructions that, when executed by the computer processor, cause the apparatus to carry out the steps of:

determining whether the critical job has completed executing; and responsive to determining that the critical job has completed executing, unlocking each of the one or more computing devices in the computing system utilized during execution of the critical job from undergoing the configuration change.

7. The apparatus of claim 5 wherein locking each of the one or more computing devices in the computing system utilized during execution of the critical job from undergoing the configuration change during execution of the critical job further comprises locking at least one of the computing devices from undergoing the configuration change to a predetermined component of the computing device.

8. The apparatus of claim 5 wherein:

identifying the critical job executing in the computing system further comprises identifying the critical job scheduled for execution on the computing system;

identifying one or more computing devices in the computing system utilized during execution of the critical job further comprises identifying one or more computing devices in the computing system scheduled for utilization during execution of the critical job; and locking each of the one or more computing devices in the computing system utilized during execution of the critical job from undergoing the configuration change during execution of the critical job further comprises locking each of the one or more computing devices in the computing system scheduled for utilization during execution of the critical job from undergoing the configuration change prior to initiating execution of the critical job scheduled for execution on the computing system.

9. A computer program product including a computer readable medium, wherein the computer readable medium is not a signal, the computer program product comprising computer program instructions that, when executed, cause a computer to carry out the steps of:

identifying a critical job executing in a computing system, wherein identifying the critical job includes identifying a job executing in the computing system that includes a criticality level that meets a predetermined threshold based on metadata associated with the job;

identifying one or more computing devices in the computing system utilized during execution of the critical job; and locking each of the one or more computing devices in the computing system utilized during execution of the critical job from undergoing a configuration change during execution of the critical job, wherein locking includes locking each of the one or more computing devices from undergoing a predetermined type of configuration change during execution of the critical job.

10. The computer program product of claim 9 further comprising computer program instructions that, when executed, cause the computer to carry out the steps of:

determining whether the critical job has completed executing; and responsive to determining that the critical job has completed executing, unlocking each of the one or more computing devices in the computing system utilized during execution of the critical job from undergoing the configuration change.

11. The computer program product of claim 9 wherein locking each of the one or more computing devices in the computing system utilized during execution of the critical job from undergoing the configuration change during execution of the critical job further comprises locking at least one of the computing devices from undergoing a configuration change to a predetermined component of the computing device.

12. The computer program product of claim 9 wherein:
identifying the critical job executing in the computing system further comprises identifying the critical job scheduled for execution on the computing system;
identifying one or more computing devices in the computing system utilized during execution of the critical job further comprises identifying one or more computing devices in the computing system scheduled for utilization during execution of the critical job; and
locking each of the one or more computing devices in the computing system utilized during execution of the critical job from undergoing the configuration change during execution of the critical job further comprises locking each of the one or more computing devices in the computing system scheduled for utilization during execution of the critical job from undergoing the configuration change prior to initiating execution of the critical job scheduled for execution on the computing system.

* * * * *